United States Patent [19]

Moss et al.

[11] Patent Number: 4,619,842
[45] Date of Patent: Oct. 28, 1986

[54] METHODS OF AND APPARATUS FOR MARKING ELONGATED STRAND MATERIAL

[75] Inventors: Parry A. Moss; Francis A. Rotoloni, both of Norcross, Ga.

[73] Assignee: AT&T Technologies, Inc., Berkeley Heights, N.J.

[21] Appl. No.: 717,205

[22] Filed: Mar. 28, 1985

[51] Int. Cl.[4] .............................. B05D 5/00; B05C 1/16
[52] U.S. Cl. ................................. 427/163; 118/210; 118/220; 118/221; 118/234; 118/260; 118/DIG. 21; 427/286; 427/287
[58] Field of Search ............... 118/234, 210, DIG. 21, 118/260, 220, 221; 427/286, 163, 287

[56] References Cited

U.S. PATENT DOCUMENTS

| | | | |
|---|---|---|---|
| 2,366,198 | 1/1945 | Kresse et al. | 118/260 X |
| 2,428,284 | 9/1947 | Krogel | 118/314 |
| 2,428,965 | 10/1947 | Frisco et al. | 118/223 |
| 2,676,565 | 4/1954 | McDermott | 118/325 |
| 2,815,710 | 12/1957 | Pearson | 101/37 |
| 3,021,815 | 2/1962 | Burke et al. | 118/314 |
| 3,043,721 | 7/1962 | Burns | 118/234 X |
| 3,392,702 | 7/1968 | Warner | 118/246 |
| 3,434,456 | 3/1969 | Geating | 118/211 |
| 3,594,228 | 7/1971 | Mock | 427/118 |
| 3,862,853 | 1/1975 | Benson | 118/234 X |

OTHER PUBLICATIONS

Cole-Parmer Instrument Co. Brochure, "Exclusively from Cole-Parmer ISMATEC", Chicago, Illinois, 1963, pp. 1-12.

Primary Examiner—Evan K. Lawrence
Attorney, Agent, or Firm—E. W. Somers

[57] ABSTRACT

An advancing optical fiber (22) is marked with a plurality of spaced indicia along its longitudinal axis. The indicia are applied by an applicator wheel (56) in the form of a disc which is mounted for rotation about an axis which is transverse to the path of travel of the optical fiber. The wheel has a plurality of marking teeth (70-70) arranged about its periphery with each tooth provided with a groove (72) for receiving increments of length of the optical fiber as it is moved rotatably. As the wheel is turned, each tooth in seriatim compresses a porous, resilient pad (80) which is disposed to one side of the wheel in a chamber through which the optical fiber is advanced to cause ink from the pad to be received in the groove of each tooth. Further rotation of the wheel causes ink to be transferred from each groove to the moving fiber. The pad is supplied with ink through a tube by a peristaltic pump (90).

11 Claims, 14 Drawing Figures

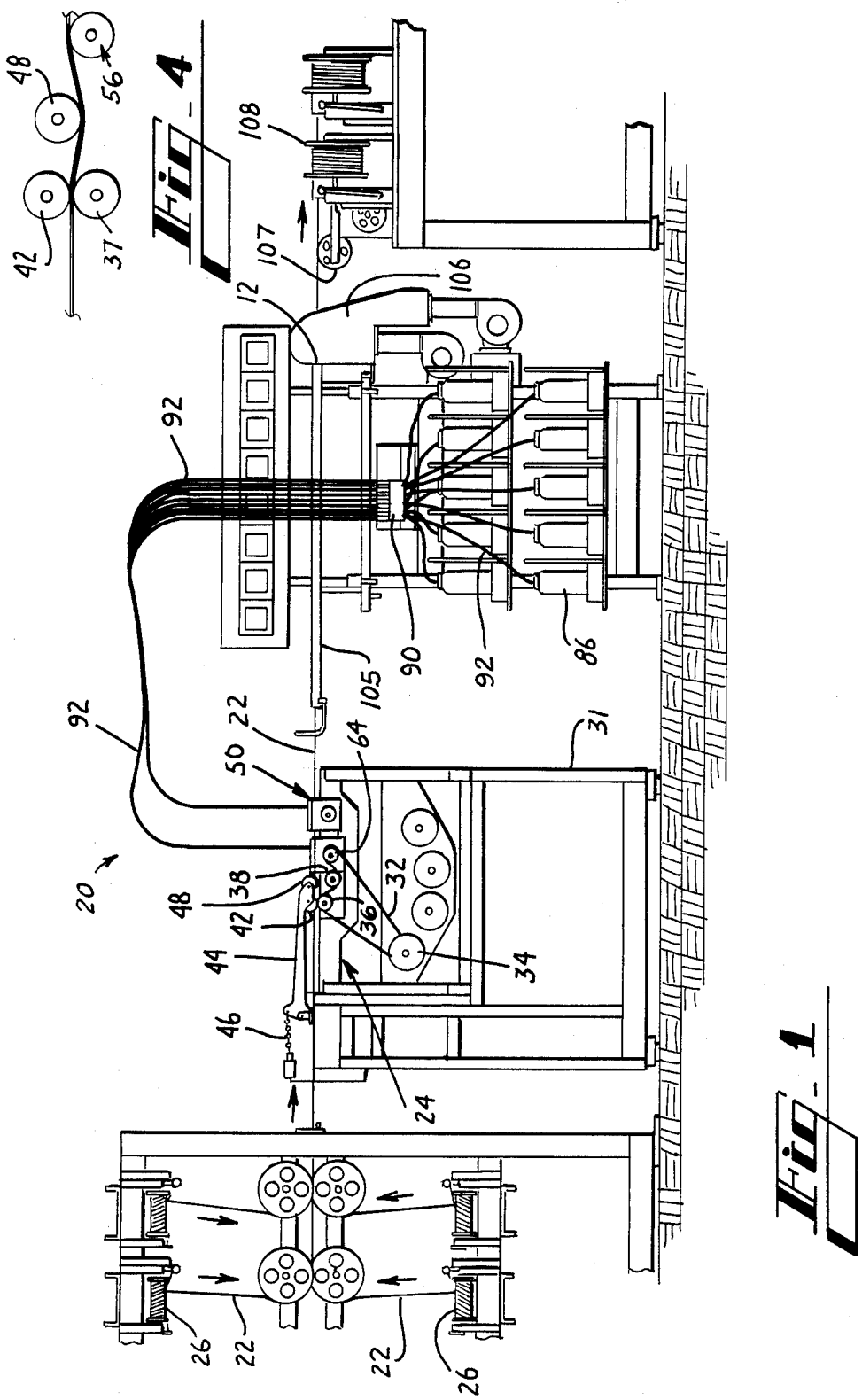

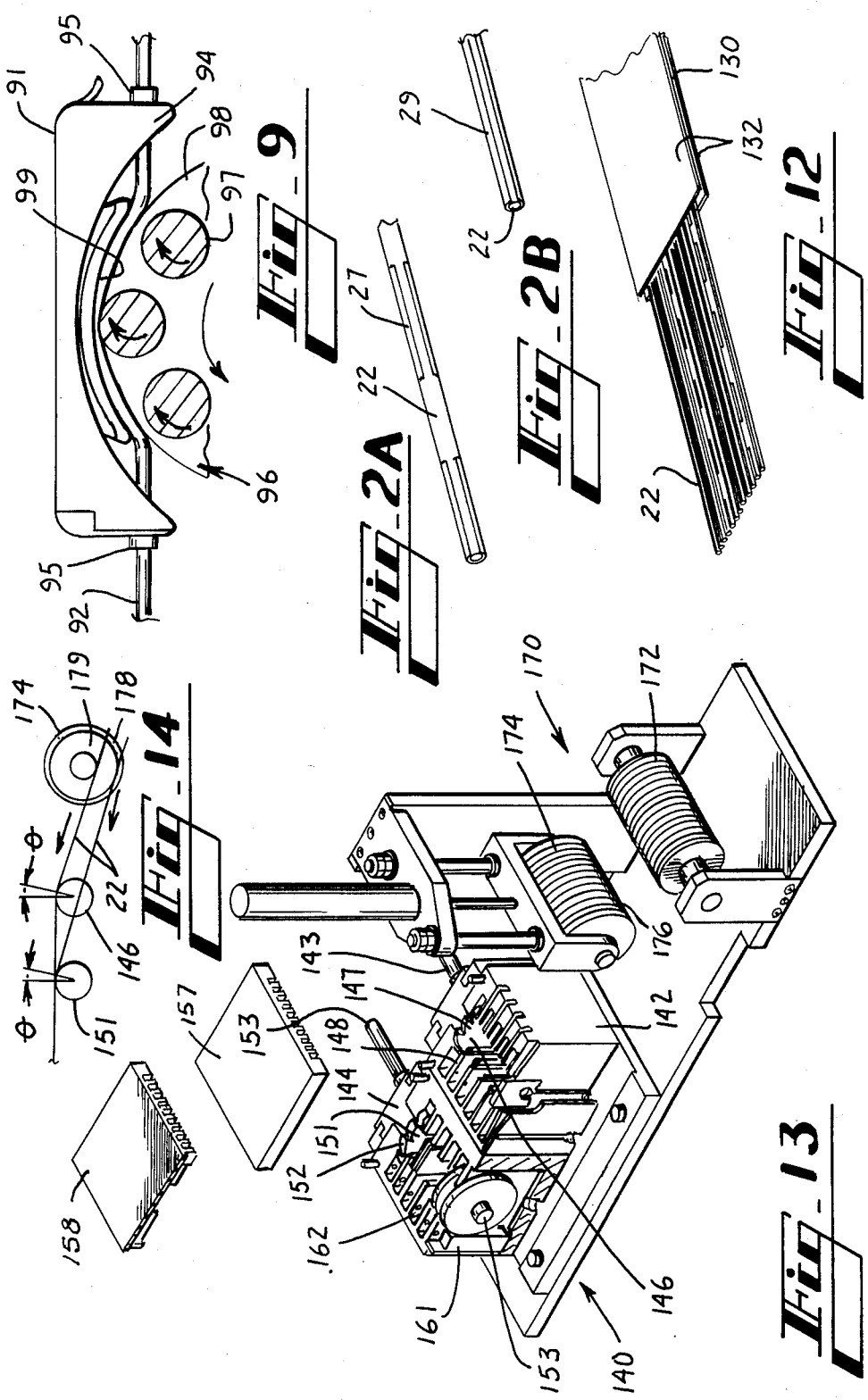

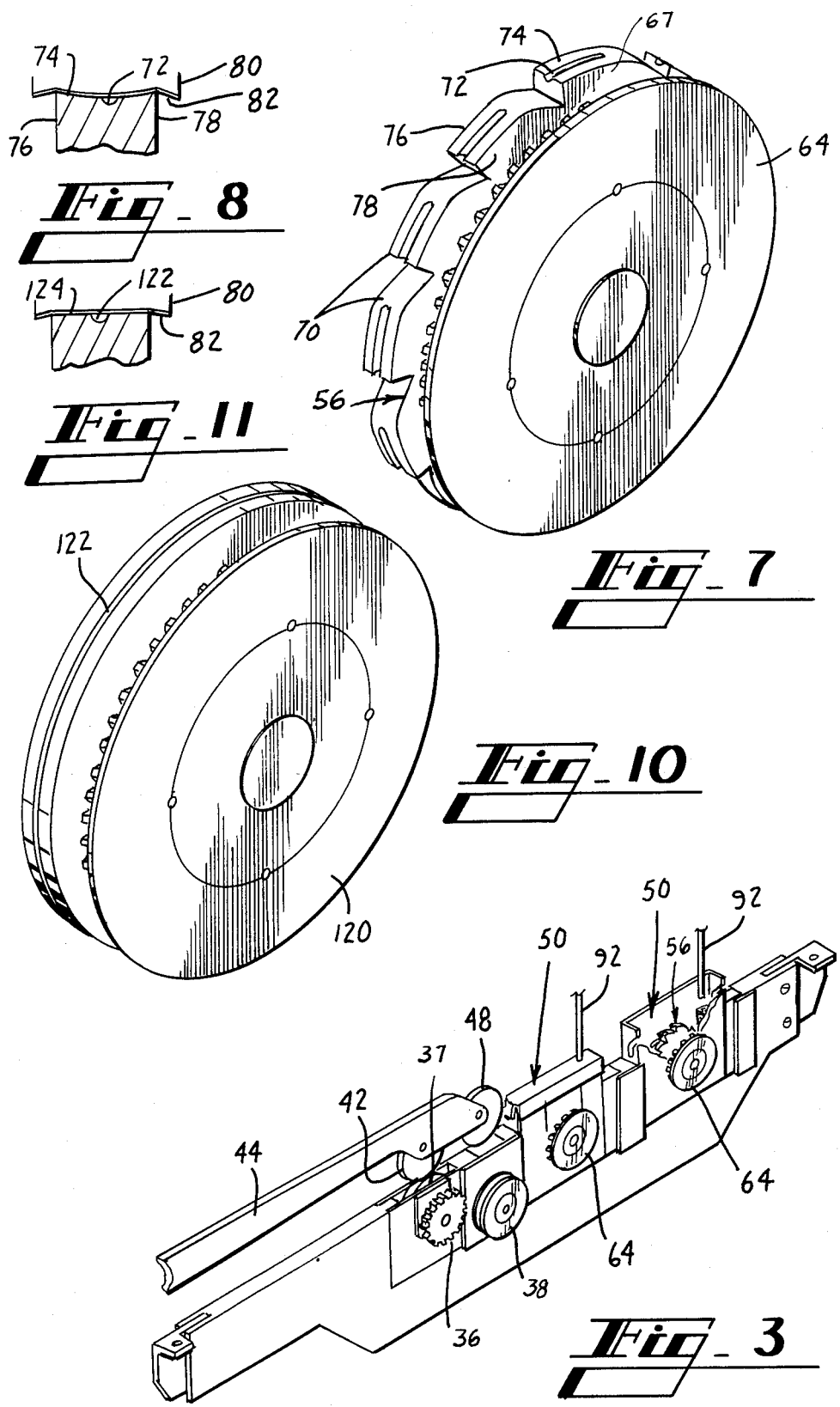

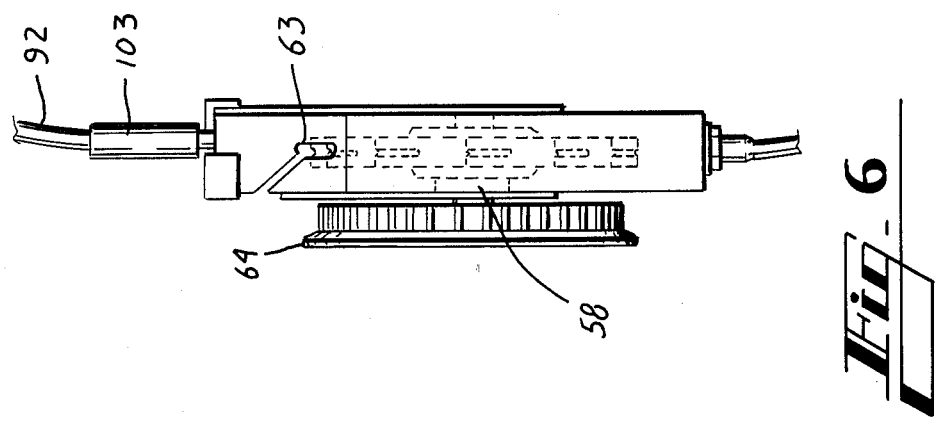
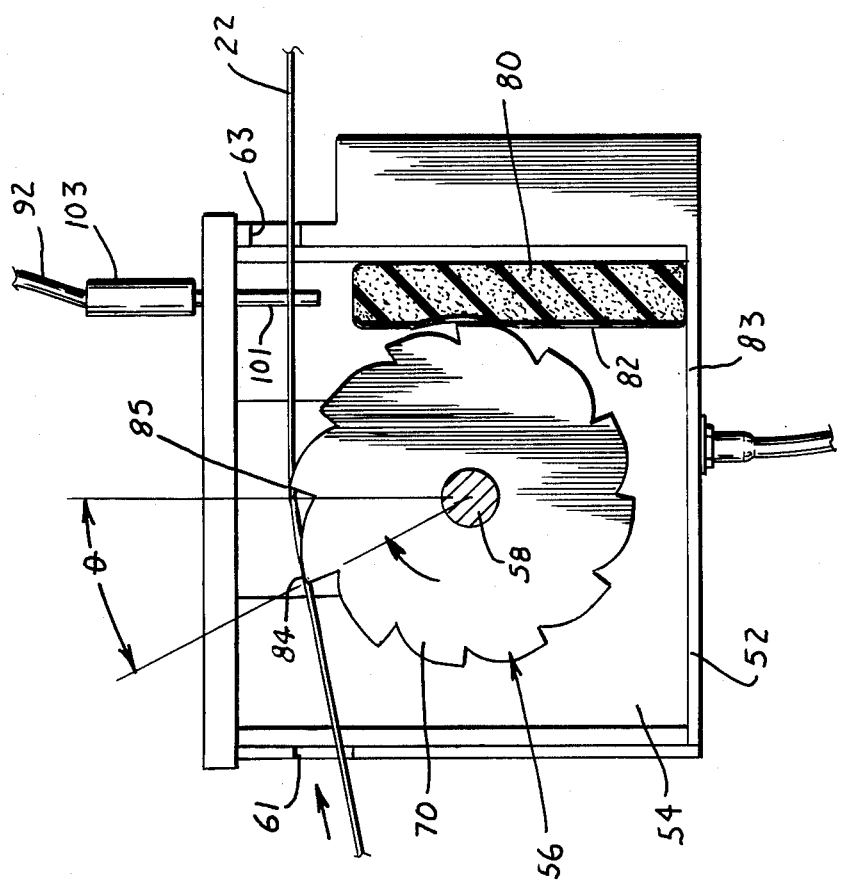

METHODS OF AND APPARATUS FOR MARKING ELONGATED STRAND MATERIAL

TECHNICAL FIELD

This invention relates to methods of and apparatus for marking elongated strand material. More particularly, it relates to methods of and apparatus for applying an identifiable marking to an optical fiber.

BACKGROUND OF THE INVENTION

The use of optical fibers for communications is growing at an unprecedented rate. An optical fiber comprises a glass fiber which is drawn from a preform and which has an uncoated diameter of about 125 microns and a coated diameter of about 250 microns.

Subsequently, the drawn optical fiber may be marked for purposes of identification in the field. Identification becomes necessary inasmuch as some cables which are shipped to the field are not preconnectorized in the factory. Also, if cables in the field are damaged such as by inadvertent impact with construction equipment, it becomes necessary to splice optical fibers to replace the damaged portions.

Generally, an optical fiber is identified by a marking which is provided on the outer surface of the coated fiber. The marking usually comprises inked indicia which are spaced along the length of the optical fiber. Typically, the markings are about 0.25 inch long and spaced apart about 0.25 inch. The ink which is used to mark the fibers typically is a permanent ink having a viscosity of about 3-5 cps at ambient temperature. Each inked indicium is applied about only two thirds of the periphery of each optical fiber. This is helpful to particular tests of the marked fiber which are made when it is wrapped about a mandrel, for example.

As can be imagined, the prior art includes arrangements for marking elongated strand material and for marking optical fibers. One such arrangement for elongated strand material is shown in U.S. Pat. No. 3,176,650 which issued to H. L. Woellner on Apr. 6, 1965. In that apparatus, a disc is mounted for rotation about an axis which is angled to the path of travel of an advancing elongated strand material. As the disc turns, a marking medium is flowed radially outwardly to ports to allow the marking medium to be slung into contact with the elongated strand material.

As for optical fibers, it has been customary to advance a fiber across and in engagement with a wick to which a marking ink is supplied. A cam is used to engage the moving optical fiber and intermittently to disengage the optical fiber from the wick to thereby provide spaced indicia along the fiber. Problems have occurred in the use of such an arrangement. The indicia, typically in the form of dashes, are not uniform and it is difficult to synchronize the movement of the cam with the line speed of the optical fiber.

In another commercially available apparatus, a grease-like ink is pumped upwardly into an application chamber through which an optical fiber is being advanced into engagement with an applicator wheel. It has been found that this arrangement requires a thorough cleaning afer it had been used to mark about 1000 meters of fiber. Also, there is no provision for overflow of the ink. Consequently, it is difficult to control the quantity of ink in the application chamber. If there is too much ink, the applicator wheel becomes clogged; if there is too little, it is starved.

Another desired capability of an inking apparatus is that its geometry permits a plurality of such apparatus to be arranged side-by-side to ink a plurality of optical fibers moving in parallel paths prior to the assembly of the fibers into a ribbon. Many commercially available marking arrangements are too bulky to permit such side-by-side use to mark optical fibers which are moving along closely spaced paths.

Clearly, there is a need for methods and apparatus for marking optical fibers in a uniform manner to facilitate field identification. The sought-after apparatus should be one which can be placed side-by-side with other identical apparatus to mark a plurality of optical fibers being advanced side-by-side in closely spaced relation to one another.

SUMMARY OF THE INVENTION

The foregoing problems have been solved by the methods and apparatus of this invention. A method of marking an elongated strand material such as an optical fiber includes the step of advancing an optical fiber along a path of travel which extends through a chamber. In the chamber is provided a supply member which in a preferred embodiment is porous and resilient and is capable of holding a liquid marking material which is adapted to mark an outer surface of the optical fiber. The liquid marking material is provided to the supply member in a controlled manner. An applicator member having a groove in a portion of its periphery is mounted for movement between the path of travel and engagement with the supply member and such that increments of length of the optical fiber are received in and then removed from the groove. The method also includes the step of moving the applicator member to engage compressively portions of the applicator member with the supply member and cause liquid marking material to be transferred from the supply member to the groove and from the groove to a predetermined peripheral portion of increments of length of the advancing optical fiber.

An apparatus for marking an optical fiber includes a chamber having an entrance port and an exit port. Facilities are provided for advancing an optical fiber along a path of travel which extends through the entrance and exit ports. Inside the chamber, an applicator member in the form of a wheel is mounted with its axis being perpendicular to and spaced from the path of travel. Also, the mounting is such that a groove formed along at least a portion of the periphery of the wheel receives increments of length of the advancing optical fiber. Also, as the wheel is turned, the grooved portion is moved past and in engagement with a porous, resilient member which is saturated substantially with an ink. The mounting is such that the wheel compresses the porous member as it is moved therepast. This causes ink to fill the groove as the periphery of the wheel is advanced through its engagement with the porous member. Ink is supplied to the porous member through a tube, an end of which is disposed above the porous member. Excess ink falls to the bottom of the chamber where it is allowed to drain from the chamber and be returned to a supply.

The geometry of this arrangement is such that a plurality of the applicator wheels can be placed side-by-side to mark simultaneously a plurality of advancing optical fibers which are spaced apart slightly. In one embodiment, the paths of the fibers through side-by-side apparatus are spaced apart about one-half of an inch.

BRIEF DESCRIPTION OF THE DRAWINGS

Other features of the present invention will be more readily understood from the following detailed description of specific embodiments thereof when read in conjunction with the accompanying drawings, in which:

FIG. 1 is an overall elevational view of an apparatus of this invention for marking optical fibers;

FIGS. 2A and 2B are perspective views of an optical fiber which has been marked in accordance with the methods and apparatus of this invention;

FIG. 3 is a perspective view of a portion of the apparatus of FIG. 1;

FIG. 4 is a detail view of a roller arrangement of the apparatus of FIG. 1;

FIG. 5 is a side elevational view partially in section of a portion of the apparatus of FIG. 1;

FIG. 6 is an end view of the portion of the apparatus of FIG. 5;

FIG. 7 is a perspective view of a preferred embodiment of an applicator wheel which is used to apply a marking to an optical fiber;

FIG. 8 is a sectional view of a portion of the wheel of FIG. 7;

FIG. 9 is a detail view of a portion of a pump which is used to supply ink for the wheel;

FIG. 10 is a perspective view of an alternative embodiment of the applicator wheel;

FIG. 11 is a detail view of a portion of the marking wheel of FIG. 10;

FIG. 12 is a perspective view of a ribbon and optical fibers thereof to be marked in accordance with this invention;

FIG. 13 is a perspective view of an arrangement for marking a plurality of fibers simultaneously prior to the assembly of the fibers into a ribbon; and FIG. 14 is a side elevational view of marking wheels and a roller of the arrangement of FIG. 13.

DETAILED DESCRIPTION

Referring now to FIG. 1 there is shown an apparatus which is designated generally by the numeral 20 and which may be used to mark simultaneously each of a plurality of optical fibers 22-22 (see FIGS. 2A and 2B) which are being advanced by a capstan designated generally by the numeral 24 from a plurality of supplies 26-26. It should be understood that the methods and apparatus of this invention may be used to mark elongated strand material, in general, such as for example, insulated metallic conductors. Each of the optical fibers 22-22 has been drawn from an optical preform coated with a protective material to provide an outside diameter of about 250 microns and has been measured and cured. A marked optical fiber 22 is provided with spaced identifiable indicia 27-27 or a continuous indicium 29 as shown in FIGS. 2A and 2B, respectively. The description of FIG. 1 which follows deals with that portion of the apparatus which marks one fiber.

The capstan 24 is supported on a stand 31 and includes a drive belt 32 which extends around a drive wheel 34, a sprocket 36 of a capstan wheel 37, and an idler sheave 38. The advancing optical fibers 22-22 are held between the capstan wheel 37 and a cooperating sheave 42 (see FIGS. 1, 3 and 4) which is mounted on one end of a hold-down arm 44 which is provided with a lifting device 46 that is used to move the arm during start up or shut down. The hold-down arm 44 also includes a second sheave 48 which is used to cause the optical fiber 22 to assume a tortuous path before entering a marking device, which is designated generally by the numeral 50. As a result, the advancing optical fiber 22 does not wander vertically as it is marked subsequently which might result in a non-uniform marking on the optical fiber.

After each of the optical fibers 22-22 is advanced out of engagement with the second wheel 48 of the hold-down arm 44, it is advanced through one or more of the marking devices 50-50. Each marking device 50 is effective to apply a liquid marking material to an advancing optical fiber 22. Two marking devices 50-50 may be used in tandem to provide alternate color markings on an optical fiber 22.

Each of the marking devices 50-50 is shown in greater detail in FIGS. 5 and 6. As can be seen, each of the marking devices 50-50 includes a housing 52 for providing a chamber 54 in which is mounted a marking or applicator member in the form of a wheel which is designated generally by the numeral 56. The applicator wheel 56 is mounted for rotation on a shaft 58 such that the wheel is caused to rotate in a clockwise direction as viewed in FIG. 5. The housing 52 also includes an entry port 61 and an exit port 63 through which each of the optical fibers 22-22 is advanced. As can be seen in FIGS. 4 and 6, a sprocket wheel 64 is mounted on the shaft 58 externally of the housing 52. The drive belt 32 extends about the sprocket wheel 64 to cause the applicator wheel 56 to be turned.

Going now to FIGS. 7 and 8, there is shown a preferred embodiment of the applicator wheel 56. As can be seen, the applicator wheel 56 includes the sprocket wheel 64 to which is attached a disc 67 which is shaped to have a plurality of marking teeth 70-70 arrayed about the periphery thereof. As can be seen in FIG. 7 and in FIG. 8, each of the marking teeth 70-70 includes a groove 72 which is used to pick up a liquid marking material such as ink, for example, and to transfer the ink into engagement with an optical fiber 22. The applicator wheel 56 is mounted within the housing such that as it rotates, the groove 72 in each of the teeth 70 is aligned in a plane with the optical fiber 22 and in fact causes increments of lengths of the optical fiber to be received within the grooves and hence to pick up the ink therein.

Further as can be seen in FIG. 8, each of the teeth 70 is provided with an arcuate surface 74 which is curved from outer surfaces 76 and 78 of the tooth toward the groove 72. It has been found that this additional curvature facilitates the pick up of ink within the chamber 54.

Returning now to FIGS. 5 and 6, there can be seen facilities for providing a liquid marking material such as ink, for example, to the applicator wheel 56. These facilities include a porous, resilient supply member in the form of a pad 80 which is disposed to one side of the wheel 56 within the chamber 54. In a preferred embodiment, the pad 80 is made of a porous, resilient material having a facing 82, which is made of a cotton cloth and which is adjacent to the applicator wheel 56. Also, in the preferred embodiment, the pad 80 is made of a urethane foam material. The pad 80 extends to a point just below the advancing optical fiber 22 and is supported on a bottom portion 83 of the housing 52.

The applicator wheel 56 and the supply member or pad 80 are disposed within the chamber 54 to facilitate the pick up of ink by the groove 72 of each tooth 70.

More specifically, they are arranged so that as the wheel 56 is turned, each tooth 70 is moved into compressive engagement with the pad 80. This compressive engagement causes ink to be squeezed from the pad 80 onto the grooved surfaces of the wheel where it is held by surface tension until it is transferred to an advancing optical fiber. The facing 82 results in a more uniform ink coverage across the width of the peripheral surface of the wheel 56. This, of course, causes the ink coverage on the optical fiber 22 to be more uniform.

Each tooth 70 is designed so that as the wheel 56 turns, initially, a portion of each successive tooth barely touches the facing 82. However, continual rotation of the wheel causes each successive tooth 70 to compress the pad 80. The intermittent compressive engagement of successive teeth causes a pumping action that results in ink being squeezed from the pad 80 and received in the groove 72.

Also, of importance to the transfer of liquid marking material from the applicator wheel 56 to the advancing optical fiber 22 are the points along the path of travel between which the optical fiber may be marked by the applicator wheel. As can be seen from a consideration of FIGS. 5 and 7, the optical fiber is received in a groove 72 at a position designated by the numeral 84 and is removed from the wheel 56 at a position designated by the numeral 85. An angle between radii drawn to these points is designated $\theta$ and is referred to as the angle of wrap. This path of the optical fiber is occasioned by the engagement of the sheave 48 of the holddown arm 44 with the advancing optical fiber. As a result of the use of a predetermined angle of wrap, time is provided for the transfer of ink from the groove 72 to the portion of the optical fiber and insures a permanent marking adhered to the surface of the coated fiber.

The ink is provided from supplies 86-86 (see FIG. 1) through supply lines 92-92 in the form of plastic tubing to the chamber 54 by a peristaltic pump which is designated generally by the numeral 90. From the pump 90, the ink is caused to be flowed through the lines 92-92 to associated ones of the applicator wheels 56-56.

The peristaltic pump 90 may be one such as is marketed by the Cole-Parmer Instrument Company of Chicago, Ill., under the trade name ISMATEC. The peristaltic pump may be a 4, 8, 12 or 16 position pump and performs in a manner which is particularly suited to the marking of optical fibers. In this kind of pump, clogging does not occur even though a pigmented ink is used to mark each optical fiber 22. In the peristaltic pump 90 there is no fluid contact with the inside workings of the pump or the electrical parts, which reduces maintenance costs. The peristaltic pump 90 is arranged so that cartridges 91-91 (see FIG. 9) operate to squeeze on the tubing 92 leading from the supplies 86-86 while the pump is in operation. Further, the pump 90 is reversible so that it may be used to clean the lines.

Referring again to FIG. 9, there is shown a cartridge 91 having end portions 94-94 depending therefrom. Each length of tubing 92 includes spaced sleeves 95-95 placed about a length of the tubing such that the sleeves are disposed outside the depending portions 94-94 of the cartridge. A roller 96 having a plurality of rods 97-97 spanning between end plates 98-98 is turned rotatably to cause the rods to engage the length of tubing between the sleeves and to compress that length of tubing against an underside surface 99 of the cartridge. This causes vacuum to be applied to the supplies 86-86 to cause ink to be withdrawn therefrom and flowed along each length of tubing 92. The spacing of the sleeves is important to define the length of tubing that will be tensioned within each cartridge 91.

As the portions of the cartridges 91-91 squeeze on the supply lines 92-92, ink is caused to be withdrawn from the supply containers and pushed along the lines 92-92 to injector nozzles 101-101 as is shown in FIG. 5. A coupling 103 provides an easy removal of the injection nozzle 101 from its associated line 92.

The peristaltic pump 90 functions to cause a dripping of the ink, which may be pigmented, from the injector nozzle 101 onto the urethane foam pad 80. The pad 80 is constantly saturated, providing for a pick up of the ink by the grooves 72-72 of the teeth 70-70 of the applicator wheel 56. Hereinbefore, it was noted that each of the teeth 70-70 of the applicator wheel 56 is provided with an arcuate surface 74 on each side of the groove 72. This curvature descending to the groove is helpful so that when each tooth 72 is moved into compressive engagement with the pad 80, it causes the ink from the pad to run into the groove. As a result, the applicator wheel 50 is extremely efficient in picking up ink from the pad 80 and transferring it to the advancing optical fiber 22.

Also it should be noted that unlike prior art apparatus for marking elongated strand material, there is no throw-out of ink from a rotating disc onto an elongated strand material which is advancing in a direction transverse of the axis of the disc. Rather there is a smooth transfer by contact from the applicator wheel 56 to the optical fiber itself. Further in some prior art apparatus, there is an indirect transfer of the ink through several wheels onto elongated strand material which is moving in a path of travel. This is not so in this apparatus in that the transfer is directly from the ink pad 80 through the applicator wheel to the advancing optical fiber 22.

Another feature of the invention is the speed of the applicator wheel 56 relative to that of the optical fiber 22. The speed of the applicator wheel 56 is slightly greater than that of the optical fiber. As a result, there is a wiping action as the applicator wheel 56 engages the moving fiber 22. This helps to insure that a marking is applied to the fiber and extended along a portion of its length. Typically, the peripheral speed of the wheel 56 is about 5 to 10% greater than the speed at which the optical fiber is being advanced along its path of travel.

After its application, the liquid marking material is cured. From the applicator wheel 56, each optical fiber 22 is advanced through a drying chamber 105 (see FIG. 1) which extends longitudinally along the path of the optical fiber above the supplies of ink and the peristaltic pump. The drying of the ink is accomplished by using counterflow heat exchange. At one end of each of the drying chambers 105 is located a blower 106 which is used to cause heated air to be flowed down a length of the drying chamber to dry the ink on the advancing optical fiber 22. The heated air is flowed in a direction opposite to that in which the optical fiber 22 is being advanced.

After the ink on the fiber has been dried sufficiently, the optical fiber is advanced over a guide sheave 107 and taken up on a spool 108. Although only two spools 108-108 are fully shown, it should be appreciated that a spool is available for each of the optical fibers 22-22. As can be seen in FIG. 2, the marked-up optical fiber includes a plurality of spaced dashes 27-27 of suitable color ink.

In FIGS. 10 and 11, there is shown a different applicator wheel which is designated generally by the number 120. The applicator wheel 120 is used to apply the continuous indicium 29 (see FIG. 2B) to an advancing optical fiber 22. The applicator wheel 120, unlike the applicator wheel 56, does not include a plurality of marking teeth 70-70 but instead includes a continuous groove 122. As the applicator wheel 120 is rotated within the chamber 54 of the housing 52, ink is transmitted from the pad 80 into the groove 122 and afterwards applied to the advancing optical fiber 22.

Further as can be seen in FIG. 11, a cross-section of the wheel 120 in the vicinity of the groove shows that surfaces 124-124 to each side of the groove are linear instead of arcuately formed. This is required in the wheel 120 which applies a solid marking to the optical fiber 22. If it were scooped as in the embodiment shown in FIG. 8, the amount of ink picked up from the pad 80, if any, would be insufficient to mark the advancing fiber 22. Without the spaced teeth 70-70 to cause a pumping action, the wheel constantly engages the pad 80 and compresses a portion of it to such an extent that in time the pad sets up with only rim contact along the edges of the wheel 80. There is no squeezing of the pad to cause ink to run into the groove 122. On the other hand, with the flat cross-sectional face of the wheel, the entire face, instead of the edges, engages and compresses the pad 80.

Advantageously, the apparatus 20 of this invention is capable of applying a marking which extends only about a portion of the periphery of the optical fiber. This is helpful, particularly when a continuous marking is applied to an optical fiber by the wheel of FIGS. 10 and 11, in order to conduct a test during the splicing of fibers, where it is important that a portion of the optical fiber 22 not be covered with ink. One of the optical fibers 22-22 to be spliced is wrapped about a mandrel and a light source provided at the opposite end of the other fiber. The fiber ends to be spliced are moved relative to each other until the amount of light which is lost through the unmarked portion of the fiber on the mandrel is maximized. This minimizes the splice loss. In order to allow the light to be emitted from the optical fiber, a window on the surface of the fiber is required. This is provided in the present invention whereby only about two-thirds of the periphery of the optical fiber is provided with an ink marking. In some inks, it is possible to remove the ink from the optical fiber in order to perform this test and to obtain a window from which the light may be emitted; however, with other inks such as UV curable ink, the ink is not removable and the ability to coat only a part of the circumference becomes very important to the post-manufacture testing process.

Referring now to FIG. 12, there is shown a ribbon 130 which includes a plurality of optical fibers 22-22 which are sandwiched between plastic tapes 132-132. A plurality of ribbons may be stacked to form an optical cable. Fiber ribbons have been used for multimode optical fibers and are presently being used for single mode. One of their advantages is the relative ease with which the fibers may be connectorized. A fiber ribbon is assembled from a plurality of optical fibers 22-22 on a manufacturing line such as is shown in U.S. Pat. No. 4,289,558 which used on Sept. 15, 1981, in the names of B. Eichenbaum and F. Topolski and which is incorporated by reference hereinto.

In FIG. 13 is shown an apparatus designated generally by the numeral 140 for marking a plurality of optical fibers 22-22 simultaneously so that afterwards on the same manufacturing line they may be assembled into a ribbon. The apparatus 140 includes two chambers 142 and 144 arranged end to end. Assuming that the ribbon is to comprise twelve fibers, the housing 142 includes six applicator wheels 146-146 arranged on a common shaft 143. The applicator wheels 146-146 each includes a plurality of teeth 147-147 and are separated by spacers 148-148 to cause them to receive and mark alternate ones of the optical fibers.

The housing 144 includes a plurality of applicator wheels 151-151 which are mounted rotably on a shaft 153. Each of the wheels 151-151 which includes a plurality of teeth 152-152 is aligned with one of the spacers 148-148 in the housing 142. The wheels 151-151 are adapted to mark alternate ones of the fibers 22-22. Of course, it should be understood that although the wheels 146 and 151 are shown comprising teeth, they could just as well be those shown in FIG. 10. Or, one or ones of the wheels 151-151 could be made as shown in FIG. 10 or the plurality 146 may be toothed or solid and the wheels 151-151 solid or toothed. Covered 157 and 158 enclose the chambers 142 and 144.

A suitable liquid marking material such as the priorly described ink is provided to each of the wheels by a porous member 161 which is positioned in the same chamber as the wheel and which is similar to the pad 80 in FIG. 5. Each porous member 161 is supplied with ink in a pulsed stream from a part 162 which leads through a peristaltic pump to a supply. It should be understood that the fibers may be marked with different colors and the marking may be discontinuous or continuous and is typically only about a portion of the periphery of each.

The optical fibers 22-22 are caused to become disposed in the grooves of the applicator wheels with a predetermined angle of wrap by being advanced in a tortuous path in engagement with a roller system 170. The roller system 170 includes rollers 172 and 174. The roller system 170 causes the optical fibers which are being advanced by a capstan to move past the spacers and to be guided into the grooves of the applicator wheels such that the angle of wrap for the wheels 146-146 and the wheels 151-151 is substantially constant.

In order to accomplish this, the roller 174 is provided with a plurality of grooves 176-176 which alternately are shallow and deep (see FIGS. 13 and 14). The shallow grooves are designated by the numeral 178-178 and the deep grooves by the numerals 179-179. Optical fibers 22-22 which are advanced into engagement with the wheels 146-146 extend through the deep grooves 179-179 whereas the optical fibers 22-22 which engage the wheels 151-151 extend through the grooves 178-178.

It should be understood that the above-described arrangements are simply illustrative of the invention. Other arrangements may be devised by those skilled in the art which will embody the principles of the invention and fall within the scope and spirit thereof.

What is claimed is:

1. A method of marking an elongated strand material, said method comprising the steps of:
   advancing an elongated strand material along a path of travel;
   providing a liquid marking material in a controlled manner to a porous, resilient supply member;
   mounting an applicator member having grooved portions spaced along the periphery thereof for movement of the grooved portions of the applicator member between the path of travel of the elongated strand material and engagement with the supply member such that increments of length of the advancing strand material are received in and then removed from the grooves; and moving the applicator member to engage in seriatim the spaced portions of the applicator member compressively with the supply member and cause liquid marking material to be transferred from the supply member to the groove of each portion, and to transfer the liquid marking material from the groove of each portion to a predetermined peripheral portion of increments of length of the advancing strand material.

2. The method of claim 1, wherein the applicator member is disc-shaped and is mounted for rotation about an axis which is perpendicular to the path of travel of the elongated strand material, and wherein the step of moving causes the applicator member to rotate.

3. The method of claim 2, wherein the applicator member has a surface speed which is slightly greater than the speed at which the elongated strand material is advanced.

4. A method of marking an optical fiber with a plurality of longitudinally spaced indicia, said method comprising the steps of:

advancing an optical fiber along a path of travel which extends through a chamber;

providing a porous, resilient ink supply member within the chamber below the path of travel;

supplying an ink in a pulsed stream to the ink supply member to cause the member to be saturated;

mounting in the chamber an applicator wheel having a plurality of marking teeth arranged about its periphery such that as the wheel is turned, each successive tooth engages compressively the supply member and a groove in each tooth picks up ink from the supply member disposed to one side of the wheel and transfers the ink directly to a predetermined portion of the periphery of the optical fiber, the wheel being mounted for rotation about an axis which is transverse to the path of travel;

turning the wheel about its axis of rotation to cause the wheel to compress the porous member and receive ink therefrom and to transfer the ink to the optical fiber; and drying the ink which has been applied to the optical fiber.

5. An apparatus for marking an elongated strand material, said apparatus comprising:

moving means for advancing an elongated strand material along a path of travel;

porous, resilient supply means for holding a liquid marking material;

at least one applicator member having spaced portions of its periphery each provided with a groove;

means for mounting said applicator member for movement of portions of the applicator member between the path of travel of the elongated strand material and engagement with the supply means such that increments of length of the advancing strand material are received in and then removed from each groove; and means for moving the applicator member to engage compressively said spaced portions of the applicator member with the supply means and cause liquid marking material to be transferred from the supply means to the groove of each spaced portion and to transfer the liquid marking material from each groove to a predetermined peripheral portion of increments of length of the advancing strand material.

6. The apparatus of claim 5, wherein the elongated strand material is an optical fiber, and said applicator member is a wheel, said apparatus including means for mounting said wheel for rotation such that the axis of rotation of said wheel is perpendicular to the path of travel and such that as it rotates, its periphery engages and compresses the porous, resilient means to pick up liquid marking material in each groove and to cause increments of length of the optical fiber to be received in a groove of the wheel, further said means for moving the applicator member including means for causing said wheel to rotate.

7. The apparatus of claim 6, wherein each of said spaced portions is a tooth, each said tooth being configured to cause compressive engagement hereof with the supply member as said wheel is rotated.

8. The apparatus of claim 7, wherein each tooth includes a peripheral surface which is concave with the groove being formed along an innermost portion of the peripheral surface.

9. The apparatus of claim 6, wherein said means for moving rotatably said wheel causes it to turn and have a surface speed which is slightly greater than that of which the optical fiber is being advanced.

10. The apparatus of claim 6, further comprising two housings, wherein a plurality of the optical fibers are advanced side-by-side through one housing and then through the other housing with said apparatus including a plurality of the applicator members comprising a first plurality of wheels and a second plurality of wheels, said first plurality being mounted in the one housing, said first plurality adapted to apply an ink to alternate ones of the plurality of fibers being advanced therepast, wherein a plurality of spacers separate the wheels of said first plurality, and wherein the second plurality of wheels are mounted in the other housing along the path of travel of the fibers to apply ink to fibers which alternate with the fibers which are marked by the first plurality of wheels.

11. The apparatus of claim 10, wherein each of the spacers between adjacent ones of the first plurality of wheels is aligned with an associated wheel of the second plurality of wheels, said apparatus also including a roller which is engaged by the advancing optical fibers prior to ones of the optical fibers being marked by the first plurality of applicator wheels, said roller including alternating deep and shallow grooves, said deep grooves being associated with said first plurality of wheels and said shallow grooves being associated with said second plurality of wheels, the arrangement causing each optical fiber to be adapted to be marked by an associated one of the first plurality of wheels along a length of the periphery of the associated one of the first plurality of wheels which is equal to the length of the periphery of each one of the second plurality of wheels along which an optical fiber is adapted to be marked.

* * * * *